Patented May 24, 1938

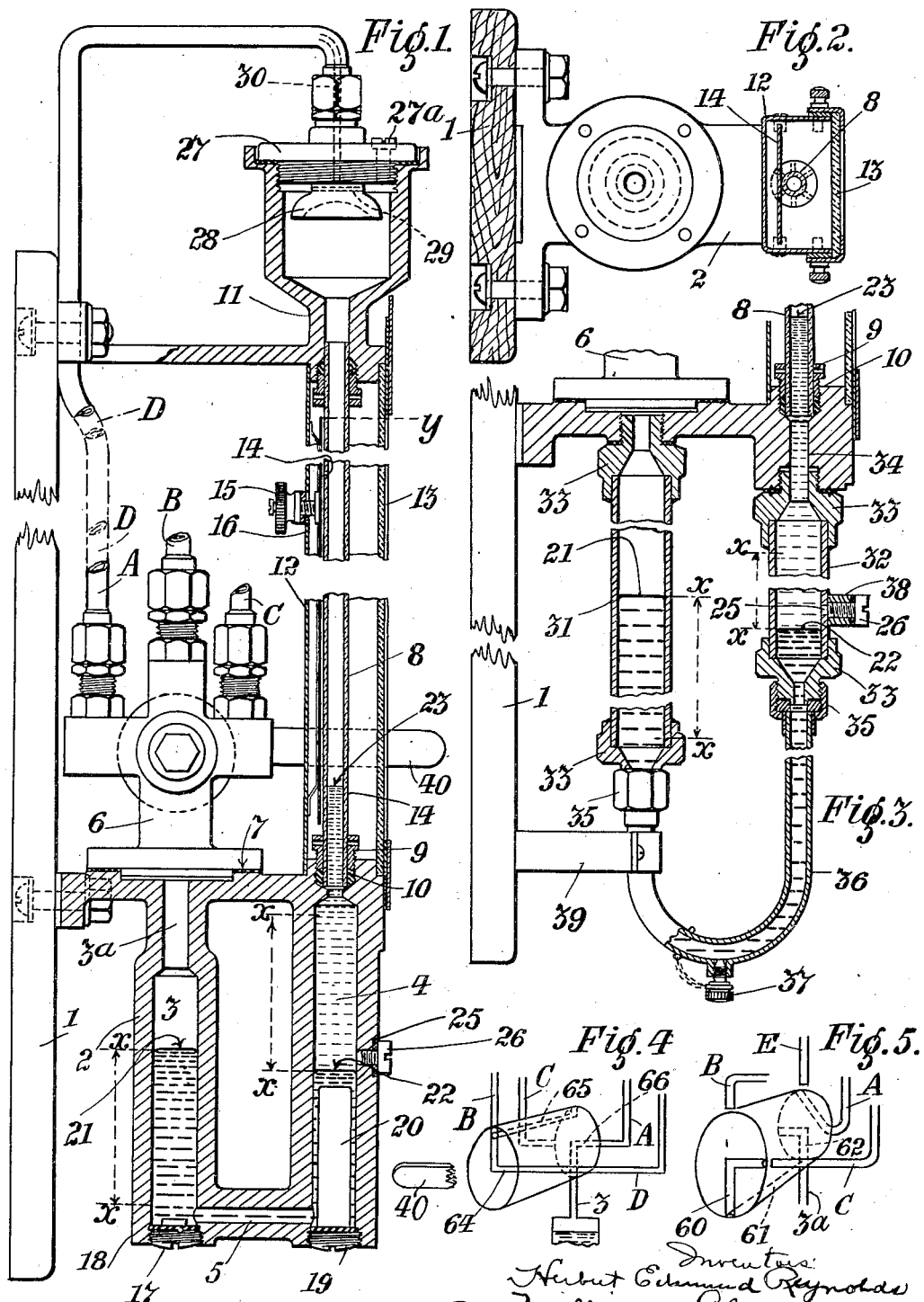

2,118,229

UNITED STATES PATENT OFFICE 2,118,229

U-TUBE GAUGE

Herbert Edmund Reynolds and William Alexander, Glasgow, Scotland, assignors to Dobbie McInnes Limited, Glasgow, Scotland Application November 10, 1936, Serial No. 110,140

7 Claims. (Cl. 73—31)

This invention relates to manometers or pressure gauges of U-tube type and mainly to those wherein two immiscible liquids of different densities are used, for example, mercury and oil, and relates especially to such gauges for use in measuring or indicating draughts, depths, displacements of floating bodies, or the depth, volume or weight of liquid in a tank or reservoir open or closed to the atmosphere.

An object of the invention is to provide an arrangement for reducing the amount of mercury required and so reducing the cost of the apparatus.

A further object is to provide means enabling the requisite amount of heavy liquid, such as mercury, to be automatically measured and enabling the level of the lighter liquid (the meniscus of which co-operates with the scale) to be readily adjusted.

A further object is to provide a gauge which can readily be made, for example, by alteration of tube bores, to give different ranges and/or scales of readings or to be suitable for indicating the depth, weight or volume of liquids of different specific gravities. By "different scales" is meant, different movement of gauge liquid per unit change of pressure acting on the gauge.

Further objects are to provide baffle means to prevent escape of the upper liquid from its tube when the gauge is subjected to an abnormally high pressure and to provide means for enabling adjustment of the scale.

Other objects will appear from the following description and appended drawing describing and illustrating how the invention can be carried into practice.

In the drawing which shows gauges for use in indicating the depths of liquids in tanks:—

Fig. 1 is a part sectional side elevation of one embodiment of the invention.

Fig. 2 is a corresponding plan view with the valve member removed.

Fig. 3 is a similar view to Fig. 1 of a modification.

Figs. 4 and 5 are diagrammatic views of operating valves and their connections.

Referring to Figs. 1 and 2 the gauge comprises a mounting board 1 to which the U-tube gauge and associated parts are bolted. The U-tube is formed by a casting 2 comprising bores 3 and 4 of comparatively large diameter which are accurately machined and connected at the foot by a narrow bore 5. The bore 3 which receives the pressure to be measured narrows at 3a and communicates with the valve casing 6 which has a fluid-tight joint at 7 with the upper face of the casting. The bore 4, which extends considerably higher than the bore 3, also narrows at the top and registers with a glass gauge tube 8 which is retained in fluid-tight connection by means of a gland 9 and fluid-tight oil-resisting packing 10. The upper end of the tube has a similar connection with the filling and overflow cup 11 which is bolted to the board 1. The tube 8 is located in a vertical casing 12 attached at its upper and lower ends respectively to the cup 11 and the casting 2. The front of the casing consists of a removable window 13 and the scale 14, which is substantially the same width as the casing 12, is mounted behind the tube 8 and held by a clamping bolt 15. This bolt can be vertically adjusted in the slot 16 in the casing 12 in order to adjust the scale 14.

The bore 3 is closed at the bottom by a screwed plug 17 and packing washer 18 while the bore 4 is closed in similar manner by a plug 19 which has an upward extension 20 of slightly smaller diameter than the bore 4. The heavier liquid is mercury and the surfaces thereof are indicated at 21 and 22 in the bores 3 and 4 respectively. The surfaces are shown in the datum positions and as the gauge is used for measuring pressures above datum or normal it follows that the surface 21 will always fall while 22 will always rise, the range of movement of these surfaces being indicated by the lines x—x, and both being equal when bores 3 and 4 are equal. Above the mercury in the bore 4, oil is provided, the upper level 23 lying in the tube 8 and constituting the indicating meniscus co-operating with the scale 14. The position shown in Fig. 1 is the datum position, the uppermost position being at y. It is important to keep the faces 21 and 22 within bores of substantially constant cross sectional area throughout their range of movement, but otherwise the bores may vary and advantage of this fact is taken to enable a saving in mercury which is expensive. This saving is effected by the plug 20 and a similar saving is achieved by making the connecting passage 5 of narrow bore. This saving is especially important in the two-liquid type of gauge which is the subject of the invention because there is a large range of movement which otherwise would require a large volume of mercury.

In order to ensure that the gauge can be automatically filled with the correct amount of mercury without weighing or otherwise measuring same, a hole 25 is provided in the wall of the bore 4, said hole being accurately located and the bores 3 and 4 accurately machined so that when the mercury in both limbs 3 and 4 has risen to the level of the lowest part of the hole the requisite amount of mercury has been obtained. Any further mercury poured in will simply overflow through said hole. During this first part of the filling operation it will be understood that the surfaces 21 and 22 will remain at the same levels since there is no column of oil to be balanced as in Fig. 1 where, due to this, the surface 21 is higher than the surface 22. When the required amount of mercury has been filled in, the hole 25 is closed by the liquid-tight plug 26. The oil is then poured in until it rises to or past the datum position. If the level of the oil, as is probable, has risen above the zero position it can readily be finely adjusted to said position by loosening the plug 26 and draining off the superfluous oil through the hole 25, which thus serves the double function of an overflow device for the mercury and a drain for the oil. Preferably the oil is a stable mobile lubricating oil of low freezing point and sulphur content which, although almost colourless is made to appear black in the tube and visible from a distance by colouring the scale with a black band behind the tube 8 on a white ground, said black band being magnified by the oil.

The filling cup 11, which has a screwed top 27 with a removable filling plug 27a, has a baffle device to prevent oil—if it should be in rapid motion—being forced over the pipe connected to the top 27 but to allow passage of air or other gas. This device comprises a cap 28 having lateral passages 29 which communicate with the bore 30 in the top 27. If the mercury in the bore 3 is subjected to a surge of abnormal pressure and oil is forced out of the tube it is caught by the baffle cap 28 and returned, but the air or other gas escapes through the passages 29 and 30. The use of the baffle member obviates the need of making the narrow tube 8 very long or of providing a similar remedy against overflow.

The arrangement in Fig. 3 is similar to that in Figs. 1 and 2 except as regards the construction of the U-tube. This consists of two tubes 31 and 32, welded or otherwise fitted at both ends into caps 33. The upper caps 33 are screwed in to register with the valve casing 6 and a bore 34 communicating with the indicating tube 8, while the lower caps 33 are attached by union nuts 35 to a U-tube 36 of relatively narrow bore having a draining plug 37 therein.

The range of movement of surfaces 21 and 22 is again x—x which are equal in length in each tube if the bores of the two tubes are equal, and the U-tube 36 is arranged with the right hand longer so that tube 32 just commences a little below the normal level of the surface 22. Thus the upper part of the right hand limb of the tube 36 has the same effect as the plug 20 in Fig. 1 and, at the same time, the narrow bore of the entire tube 36 also helps to save mercury. A slight modification of the mercury-overflow and oil-drain is necessary. A cylinder 38 is attached to the tube 32 to provide a screw thread for the plug 26. The tube 36 is supported on the board 1 by a bracket 39.

The arrangement in Fig. 3 is especially suitable for the production of instruments having different ranges or different scales as calibrated, for example, in units such as inches per foot depth of liquid in the tank for measuring the depths of liquids of different specific gravities. A longer range is simply attained by the use of longer tubes 31, 32 and 36 while tubes 31 and 32 of different diameters can be used for dealing with liquids of different specific gravities or for increasing or decreasing the scale length per unit depth of liquid in the tank.

In the case of lengthening the range, if 2" are added to the tube 31, 2" have also to be added to the right hand limb of the U-tube 36 to maintain the top thereof at the same position and 2" have to be added to the tube 32 to make a corresponding increase in the length thereof. Corresponding alterations require to be made in the length and/or calibration of the scale and in the length of parts associated with the scale.

If desired the tubes 31, 36 and 32 in the arrangement in Fig. 3 may be mounted so as to be readily replaced by tubes of different lengths and/or diameters so that any one model of the apparatus can be readily modified to suit different depths of tanks or liquids of different specific gravities.

The arrangements as shown in Figs. 1 and 2 or 3 may be adapted for use with tanks which are open or closed to atmospheric pressure.

In the first case the valve casing 6 has, in known manner, three pipes A, B and C, the corresponding valve being shown in Fig. 5. The pipe A is connected to the filling cup 11, that is, to the indicating limb of the U-tube; the pipe B is connected to a source of air under pressure and the pipe C is connected to an air bell located in known manner at the bottom of the tank or the like, the depth of whose contents have to be measured. The pipe E (Fig. 5) communicates with the atmosphere.

In operation, the handle 40 of the valve, which is of known construction, is set to put the pipe B in communication with the pipe C to the air bell by means of the passage 60 in the valve plug from which liquid is driven leaving the bell filled with air subject to the liquid pressure obtaining at the bottom of the tank, which pressure is a measure of the depth. At the same time the valve puts the pipe B in communication with the pipe A through passages 60 and 61 and with the other limb of the U-tube through the bore 3a and passages 60, 61 and 62. Thus there are simultaneous connections between the source of pressure and the air bell, and between the source of pressure and both ends of the U-tube. The valve is then turned through 90° to the position shown in Fig. 5 to give simultaneous connections between the air bell (pipe C) and the bore 3 of the gauge and between the other limb (the indicating limb), that is, pipe A and the atmosphere (pipe E). The gauge then registers the pressure of the air bell in terms of depth, weight or volume of the tank liquid. An advantage of this system is that, because the bore 3 (at the first valve setting) is subjected to the same pressure as the air bell there is no flow, at the second setting, of air from the air bell to the bore 3. The closed position of the valve lies between the two above mentioned positions.

For tanks which are closed to atmospheric pressure an additional pipe D (Fig. 1) is provided between the valve and the top of the tank. A modified form of valve, also known in the art, is used as shown in Fig. 4.

In operation, the valve is turned to the first position in which it puts the source of pressure (pipe B) into communication with the air bell (pipe C) through passages 64, 65 in the valve plug. The valve is then turned to the second position (shown in Fig. 4) in which communication is effected between the source of pressure (pipe B) and the pipe D or balance line whereupon the latter will be cleared if it happens to be choked and communication is effected between the two ends of the U-tube through passage 66, pipe A and bore 3a, thus checking the zero position. In its third position the valve puts the air bell (pipe C) into communication with the bore 3 through passage 66 and the reading is obtained, the other end of the U-tube (the indicating end pipe A) being in communication with the balance pipe D. The three positions are obtained by moving the valve handle through 180°, the second position being at 90° to the others.

The use of oil in conjunction with the mercury gives an increased movement of the meniscus 23 per unit change of pressure as compared with the use of mercury alone and an increase of movement is also obtained by the use of an indicating tube 8 which is of narrow bore compared with the bores 3 and 4 or 31 and 32. Thus a more open and readable scale is obtained. For example, with a tank 6 feet deep and containing water (S. G.=1) and with the bores 3 and 4 of say, .755" diameter and the diameter of tube 8 of say .245" the length of the scale is 19.56" and the scale is 3.26" to one foot of liquid in the tank. The following equation shows the various relationships between the range of liquid movement in the tube (or length of scale) H, the specific gravities of mercury, the oil and the liquid in the tank and the cross sectional area ($a$) of the tube 8 and the cross sectional area ($A$) of bores 3 and 4 in this case assumed equal.

$$H = \frac{\text{Tank depth} \times \text{S. G. of liquid in tank}}{\text{S. G. of oil} + \frac{a}{A}(2 \text{ S. G. of mercury} - \text{S. G. of oil})}$$

From the above equation it will be seen that H increases with increase of A.

The datum position or level of the meniscus is usually above the true zero ("0" marking) of the scale by an amount on the scale representing the height of the bottom of the air bell above the bottom of the tank. The term "zero" in the appended claims is to be understood as including said datum position or other lowest position of the indicating meniscus or other liquid surfaces in the indicating limb.

It will be understood that, although the gauges operate on the principle of measuring pressure, yet they may indicate or give readings of any desired quantity related to the pressure, such, for example, as, lineal depth, displacement, volume, weight.

We claim:—

1. A pressure measuring gauge comprising a U-tube for receiving two immiscible liquids of different densities, an indicating scale, an outlet located at a predetermined level in at least one limb, the lower side of said outlet adapted to act as an overflow for automatically measuring the volume of denser liquid filled into the tube and serving to retain the required amount of liquid in the gauge, and adjustable closure means for said outlet whereby the less dense liquid located above the first mentioned may be drained off to the desired degree.

2. A pressure measuring gauge comprising a U-tube for receiving a relatively dense liquid in the lower part thereof and a less dense liquid above the denser liquid in the measuring limb, and indicating means co-operating with the liquid in the measuring limb, said limbs each having a part of greater cross section within which the upper faces of the denser liquid remain throughout their range of movement, the lower end of the part in the measuring limb being located slightly below zero level of the liquid in the wider bore in the other limb and said parts being connected at their lower ends by a part of smaller cross section to reduce the required volume of dense liquid; an outlet with its lower side located substantially at the highest position of the surface of the denser liquid during filling of the measuring limb and serving as an overflow for removing any excess of the denser liquid when it is being filled into the gauge, and closure means for said outlet.

3. In a pressure measuring gauge comprising a U-tube for receiving denser liquid in the lower part and a less dense immiscible liquid above the denser liquid in the measuring limb, said limbs comprising a lower U portion of narrow cross section having a longer limb forming part of the pressure-measuring limb, a tube of greater cross section separably connected to said longer limb and a tube of greater cross section separably connected to the shorter limb of the U-portion, said greater cross section tubes being adapted to contain the surfaces of the denser liquid throughout their range of movement and the lower end of the tube connected to the longer limb of the U-portion being located just below the zero level of the mercury in the other tube, said U portion and tubes of greater cross-section having rigid walls to prevent variation of the cross-sectional area under pressure.

4. In a pressure measuring gauge comprising a U-tube for receiving mercury in the lower part and a less dense immiscible liquid above the mercury in the indicating limb; said limbs comprising a lower U portion of small cross section having a longer limb forming part of the indicating limb, a tube of greater cross section separably connected to said longer limb and a tube of greater cross section separably connected to the shorter limb of the U-portion, said greater cross section tubes being adapted to contain the surfaces of the mercury throughout their range of movement and the lower end of the tube connected to the longer limb of the U-portion being located just below the zero level of the mercury in the other tube; an outlet near the lower end of the greater cross section tube connected to the longer limb of the lower U-tube portion and a removable closure member for said outlet.

5. In a pressure measuring gauge comprising a U-tube for receiving denser liquid in the lower part and a less dense immiscible liquid above the denser liquid in the measuring limb, said limbs comprising a lower U portion of smaller cross section having a longer limb forming part of the pressure-measuring limb, a tube of greater cross section separably connected to said longer limb and a tube of greater cross section separably connected to the shorter limb, said greater cross section tubes being adapted to contain the surfaces of the denser liquid throughout their range of movement and the lower end of the tube connected to the longer limb being located just below the zero level of the denser liquid in the other tube of greater cross section; a tube of smaller cross section separably connected to communicate with the upper end of the tube connected to said longer limb and arranged to contain the upper surface of the less dense liquid throughout its range of movement and an indicating scale associated with said tube of small cross section for co-operation with the said surface.

6. In a pressure measuring gauge comprising a

U-tube for receiving mercury in the lower part and a less dense immiscible liquid above the mercury in the indicating limb; said limbs comprising a lower U portion of narrow bore having a longer limb forming part of the indicating limb, a tube of wider bore separably connected to said longer limb and a tube of wider bore separably connected to the shorter limb of the U-portion, said wider bore tubes being adapted to contain the surfaces of the mercury throughout their range of movement and the lower end of the wider bore tube connected to the longer limb being located just below the zero level of the mercury in the other wider bore tube; a narrow bore tube separably connected to communicate with the upper end of the wider bore tube connected to the longer limb and arranged to contain the upper surface of the less dense liquid throughout its range of movement and an indicating scale associated with said narrow bore tube for co-operation with the said surface; an outlet near the lower end of the wider bore tube connected to said longer limb and a removable closure member for said outlet.

7. A pressure measuring gauge comprising a U-tube for receiving two immiscible liquids of different densities, an outlet in at least one limb of the tube, said outlet being located at a predetermined level so as to act as an overflow for excess denser liquid beyond the amount required when filling the tube, and the highest part of the inner end of the outlet being located above the level of the top of the lower column of denser liquid when the upper column of less dense liquid is in place, and adjustable closure means for said outlet.

HERBERT EDMUND REYNOLDS.
WILLIAM ALEXANDER.